Oct. 19, 1965  R. N. MASSEY ETAL  3,212,628
PORTABLE BELT TYPE CONVEYOR-ELEVATOR
Filed April 8, 1963
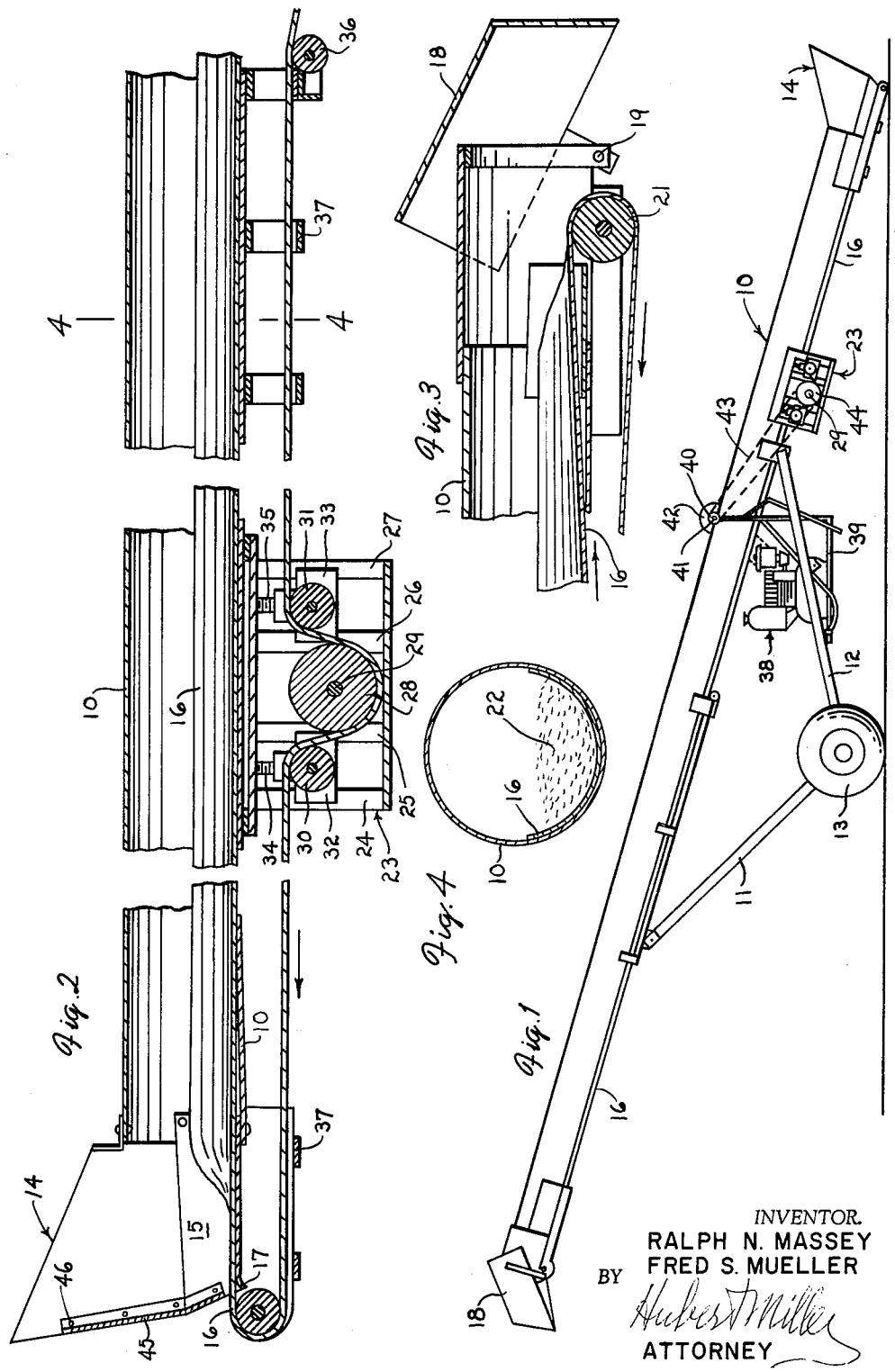
INVENTOR.
RALPH N. MASSEY
FRED S. MUELLER
BY
*Hubert Miller*
ATTORNEY 3,212,628
PORTABLE BELT TYPE CONVEYOR-ELEVATOR
Ralph N. Massey, Ensign, and Fred S. Mueller, Dodge City, Kans., assignors to Speed King Manufacturing Company, Inc., Dodge City, Kans., a corporation of Kansas
Filed Apr. 8, 1963, Ser. No. 271,130
5 Claims. (Cl. 198—201)

This invention relates to improvements in endless conveyors and elevators of the endless belt type intended for general use in moving and elevating comminuted material, small grains, and other crushed or broken up material of various particle sizes.

As is well known, in a belt conveyor it is the upper flight or reach of the endless belt which conveys the material from one location to another. A conveyor-elevator embodying our invention eliminates the falling of material over the sides of the upper belt flight onto the lower belt flight. Since the falling of material over the sides of the belt is eliminated, the need for a trough like structure to catch and recover such material is also eliminated. Our invention eliminates the need for continuous or spaced guides beneath or along the side edges of the upper belt flight. Our invention substantially eliminates the cracking, grinding and break-up of material being conveyed, and consequently eliminates the gumming of conveyed material on either surface of the conveyor belt.

An additional advantage of our invention is that it provides a positive non-slip drive for the conveyor belt through the use of belt tensioning pulleys located on each side of the belt driving pulley to force the belt into 180° wrap around contact with the surface of the driving pulley.

The invention, together with other objects attending its production, will be more clearly understood when the following description is read in connection with the accompanying drawing, in which:

FIG. 1 is a side elevational view of a conveyor-elevator embodying the invention;

FIG. 2 is a central longitudinal vertical sectional view through a portion of the conveyor-elevator shown in FIG. 1;

FIG. 3 is a similar sectional view through an additional portion of the same; and FIG. 4 is a transverse sectional view taken along the line 4—4 of FIG. 2.

The conveyor-elevator illustrated includes an elongated, solid-walled, rigid self supporting tube 10, which is open at both ends, and which defines an enclosed passage through which material is conveyed.

A wheeled ground support is secured to tube 10 intermediate its ends. Such support includes a pair of identical laterally spaced frame members 11, a pair of identical laterally spaced frame members 12, and a pair of laterally spaced ground wheels 13. While it is not a part of the invention, and is not shown in detail in the drawing, the upper ends of frame members 11 are slidably secured to tube 10 so that the height of the ground support may be varied.

The intake end of tube 10 carries a hopper 14, the bottom 15 of which extends beneath the upper flight of a belt 16, and serves as a belt guide. (See FIG. 2.) The outer end of hopper bottom plate 15 is transversely flat with an integral downturned lip 17, while the inner end of plate 15 is complementally arcuate to fit inside the end of tube 10, as shown.

The outlet end of tube 10 is provided with a material deflecting hood 18, which is pivotally mounted on a transverse pivot axis 19, to vary the angle of material deflection.

Belt pulleys 20 and 21 are mounted transversely on tube 10, one near each of its ends. The rotational axes of the belt pulleys are correspondingly offset laterally with respect to the tube to locate the respective pulley surfaces in positions of substantial tangency with the tube wall, if geometrically projected.

A flexible endless conveyor belt 16 is strung over the pulleys 20 and 21 with its upper flight or reach passing through tube 10, and its lower flight extending along the nether surface of the tube. The belt 16 is of greater width than the diameter of tube 10. Hence, as the belt travels over its pulleys in the direction shown by the arrow in FIG. 2, arcuate plate 15 cups or dishes the belt laterally as it leaves pulley 20, and causes the upper flight of the belt to conform complementally to the shape of the lower half of the tube throughout its length, as illustrated in FIG. 4. The numeral 22 in FIG. 4 identifies the material being conveyed by the belt, and illustrates the position assumed by the material within the cupped upper flight of the belt.

A combination belt driving and belt tensioning unit, identified as a whole by the numeral 23 in FIG. 2, is suitably secured to and suspended beneath the tube 10, intermediate its ends.

This unit includes a generally U-shaped frame which includes 4 correspondingly positioned upright guide strips 24, 25, 26 and 27 at each of its opposite sides. The frame journals a transversely disposed belt driving pulley 28 on a shaft 29.

Located fore and aft of pulley 28 are two transversely disposed belt tensioning pulleys 30 and 31, on shafts journaled in opposed pairs of bearing blocks 32 and 33. The blocks 32 are slidable vertically in the opposed pairs of guide strips 24 and 25. Likewise the blocks 33 are slidable vertically in the opposed pairs of guide strips 26 and 27. Vertical positioning of the blocks 32 and 33 in their slideways is accomplished by hand manipulated screws 34 and 35, one rotatably connected to each of the four blocks.

As illustrated in FIG. 2, the lower flight of belt 16 passes over pulley 31, beneath drive pulley 28, and over pulley 30. Pulleys 30 and 31 thus force the belt to wrap approximately 180° around the drive pulley 28. By raising either or both of the pulleys 30 or 31, the belt tension is increased, and a firmer frictional contact with the drive pulley 28 is accomplished.

One or more idler pulleys 36 and belt guide hangers 37 are mounted at spaced intervals along the nether surface of the tube 10 to guide the path of travel of the lower flight of belt 16.

A power unit 38 for driving the driven pulley 28, and consequently belt 16, is mounted on a generally L-shaped rigid frame 39, which in turn is secured to and supported by tube 10.

A power train from the power unit drive shaft sheave (not visible) includes a jack shaft 41, journaled in a bearing block at the upper end of frame 39, and carrying sheaves 40 and 42 on its opposite ends; a V-belt connecting the engine drive shaft sheave and sheave 42; and a V-belt 43 connecting sheave 40 with a sheave 44, which is keyed to the shaft 29, to which belt driving pulley 28 is also keyed.

Referring to FIG. 2, the aft or outer end of hopper 14 is shown as being closed by a flanged cross plate 45. Plate 45 is secured to the opposite side panels of the hopper by means of a plurality of small bolts 46. The plate is easily removable to accommodate the delivery end of a small pick-up conveyor trough (not shown) which is often used to deliver material onto the upper flight of the conveyor-elevator belt.

From the above description it will be seen that our invention provides a highly simplified conveyor-elevator construction which practically eliminates loss of material from the machine during the transfer of material from the hopper end into a vehicle or storage bin. In practical use, the conveyor belt travels at approximately 850 feet per minute. It will convey and dump 2400 bushels per hour of small grains, 1500 pounds per minute of peas or peanuts, or 2800 pounds per minute of nitrate fertilizer, all at an inclination of 30° to 35°.

Having described the invention with sufficient clarity to enable those familiar with this art to construct and use it, we claim:

1. A conveyor-elevator comprising:

an elongated, solid walled, rigid, self-supporting tube open at each of its ends, defining an enclosed passage through which material is conveyed;

belt pulleys mounted transversely on said tube, one adjacent but spaced slightly longitudinally from each of its open ends, the rotational axes of said pulleys being correspondingly offset laterally with respect to the central longitudinal axis of the tube a sufficient distance to position the respective upper peripheral surfaces of the pulleys and endwise projections of the respective lower ends of the tube in substantial tangency;

a flexible endless belt of a width greater than the diameter but not greater than one-half the circumference of said tube strung over said pulleys with its upper flight extending through said tube, and with its lower flight extending exteriorly along the nether surface of said tube in spaced relation thereto, the relatively smaller transverse dimension of the tube wall serving as a guide to cause the upper flight of the belt to slidably engage and conform to the cross sectional shape of substantially the lower half segmental portion of the tube throughout its length, thus forming a cross sectionally arcuate, trough-like moving false bottom for the tube when the belt is moved over its pulleys;

and power means for driving said belt over its pulleys to move material deposited on the upper flight of said belt near one end of the tube, through the tube within the confines of the trough-like moving false bottom formed by said belt, and to discharge such material from said belt at the other end of the tube.

2. The conveyor-elevator described in claim 1 in which the power means for driving the belt comprises:

a driven pulley mounted transversely on and suspended from the tube in driving engagement with one surface of the lower flight of said belt, the belt engaging portion of the periphery of said driven pulley being offset with respect to the normal path of travel of the lower flight of said belt;

and a pair of belt tensioning idler pulleys also mounted transversely on and suspended from the tube, one positioned fore and one aft of said driven pulley and adjustable in tensioning position away from the axis of said driven pulley, and engaging the other surface of the lower flight of said belt in positions to maintain the lower flight of the belt in constant driving engagement with the said driven pulley.

3. The conveyor-elevator described in claim 1, in further combination with a wheeled ground support for said tube-like member, engaging and supporting said member intermediate its ends in such manner that said member may be positioned in an inclined position with one end at ground level and the other end elevated.

4. The conveyor-elevator described in claim 1, in further combination with a material deflector mounted on one end of the tube-like member for angular adjustment with respect to the longitudinal axis thereof, and a material receiving hopper mounted on the other end of said tube-like member to overlie that flat section of the upper flight of said belt in support between the corresponding one of said end pulleys and the corresponding open end of said tube.

5. A conveyor-elevator comprising:

an elongated tube open at each of its ends;

a flexible endless belt in movable extension through said tube, said belt being of a width greater than the diameter but not greater than one-half the circumference of the tube to cause the belt to conform to the shape of substantially the lower half segmental portion of the tube, thus forming a cross sectionally arcuate trough-like movable false bottom for said tube;

belt guide means exterior to said tube for directing the return movement of the belt to one end of the tube from the other end thereof;

and power means for driving said belt over said belt guide means and through said tube so as to move material deposited on the belt near said one end of the tube through said tube and within the confines of the trough-like movable false bottom, and to discharge said material from the belt at said other end of the tube.

References Cited by the Examiner

UNITED STATES PATENTS

| 85,012 | 12/68 | King. | |
| 2,525,006 | 10/50 | Von Doehren | 198—120.5 |
| 2,678,717 | 5/54 | Lucas | 198—73 |
| 2,875,888 | 3/59 | Swain | 198—120.5 |

FOREIGN PATENTS

| 1,218,785 | 5/60 | France. |
| 887,698 | 1/62 | Great Britain. |

SAMUEL F. COLEMAN, *Primary Examiner.*

WILLIAM B. LA BORDE, *Examiner.*